May 29, 1934.   E. J. DOWDEN   1,961,035
TIRE VALVE STEM CAP
Filed Dec. 3, 1930
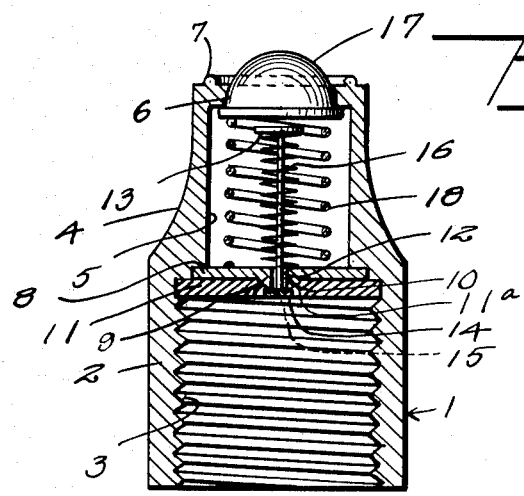
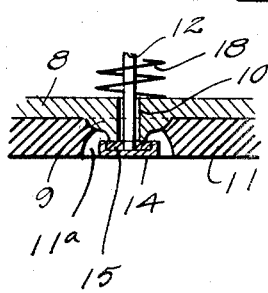
Inventor
E. J. Dowden
By Watson E. Coleman
Attorney Patented May 29, 1934

1,961,035

UNITED STATES PATENT OFFICE 1,961,035

TIRE VALVE STEM CAP

Ernest J. Dowden, Gettysburg, S. Dak.

Application December 3, 1930, Serial No. 499,807

2 Claims. (Cl. 152—12)

This invention relates to improvements in caps for the valve tubes of motor vehicle tires and relates particularly to a valved cap.

The primary object of the present invention is to provide a valved cap designed to take the place of the usual plain metal cap which is employed for covering the end of the valve tube of a pneumatic tire, and which is designed to permit the application of an air hose directly to the tube and the introduction of air to the tire inner tube without being removed and to prevent the entrance of dirt into the valve tube while the tire is in use.

Another object of the invention is to provide a cap having a pair of valves covering the inlet openings thereto, which provide a double seal against the loss of air from the tire valve tube. The present cap may be mounted upon the tire valve tube without the usual valve inside or the valve inside may be left in the tube, in which case a triple seal is formed against the escape of air from the pneumatic tire.

A still further object of the invention is to provide a valved valve cap which is of simple but strong and durable construction and which may be left on the tire valve at all times and effectively serves to prevent the loss of air from the tire inner tube.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in side elevation of the cap embodying the present invention.

Figure 2 is a view in longitudinal section of the same.

Figure 3 is an enlarged detail view of the central valve element and adjacent parts, shown in Figure 2.

Referring more particularly to the drawing, wherein like numerals of reference indicate corresponding parts throughout the several views, the numeral 1 indicates generally the valved valve cap of the character embodying the present invention which, as shown, comprises an elongated body having a lower portion 2 provided with interior screw threads 3 to facilitate its application to a tire valve stem, and an upper portion 4 which has a smooth bore or passage 5 therethrough which is of less diameter than the threaded portion 3.

The upper end of the passage 5 is constricted slightly as indicated at 6 to form a seat for a valve plug, as will be hereinafter more fully described, and the top of the portion 4 has formed thereon the annular rib 7 which engages the rubber gasket which is located within the mouth of the compressed air hose at free air stations, so as to form a tight seal to prevent the escape of air when the air hose nozzle is pressed against the reduced upper end of the cap body.

Within the body 1 there is located between the threaded lower portion and the passage 5 a metal partition plate or washer 8, from the central portion of the underface of which there projects downwardly the inverted frusto-conical body 9 through which there is formed the passage 10 which establishes communication between the bore 5 and the interior of the lower portion of the cap. Positioned against the underface of the plate 8 is a rubber washer 11 which presses against the top of the pneumatic tire tube stem when the cap is screwed thereonto. The central portion of this washer is apertured to receive the portion 9 of the metal plate 8 and this aperture opens into an enlarged recess 11a in the underface of the rubber washer, into which the end of the portion 9 projects. As shown, the end of this portion 9 terminates within the recess 11a, that is it is located a substantial distance inwardly from the plane in which the undersurface of the rubber washer lies.

Extending through the passage 10 and longitudinally of the bore or passage 5 is a stem 12 which has the disks 13 and 14 mounted respectively upon the upper and lower ends thereof.

The disk 14 has its upper face covered by a suitable sealing material 15, such as rubber, which is adapted to bear against the adjacent edge of the body 9 against which it is maintained by the spring 16 which surrounds the stem 12 within the passage 5, the lower end of this spring bearing against the plate 8, while the upper end presses against the disk 13. As shown, the disk 14, when in position against the end of the extension 9, lies entirely within the recess 11a so that it will not come into contact with any part of the upper end of the valve stem over which the cap body 1 is secured.

Positioned within the restricted upper end portion 6 of the passage 5 is a semi-spherical valve element 17, between the downwardly directed flat surface of which and the plate 8, is interposed a relatively heavy coil spring 18 which, of course, surrounds the spring 16 which controls the valve disk 14. The valve body 17 is preferably formed of metal of a suitable character but it is, of course, to be understood that the device is not to be limited to the use of a valve body of this composition as it will be readily understood that other materials, such as semi-hard rubber or the like, may be employed.

From the foregoing description it will be readily seen that the valved cap herein described may be readily threaded onto the upper end of the stem of a pneumatic tire inner tube, in place of the usual cylindrical valve cap which is employed for closing the stem.

When the present device is in position no dirt or other foreign matter can pass into the valve stem but the nozzle of a compressed air hose may be readily applied over the reduced upper end portion 4 of the cap to inject air into the tire through the cap, the valve 17 being engaged by the chuck in the outlet end of the air hose and unseated thereby, this operation bringing the valve 17 into contact with the upper end of the stem 12 and thus unseating the valve 14 and forcing the valve 14 downwardly against the end of the valve core in the stem, should there be a valve core therein, to cause this to be unseated also. It will also be understood that while the usual valve inside may be used in the valve stem to which the present cap is applied, this is not essential as the rubber gasket 10 tightly closes the valve stem to prevent the leakage of air therefrom around the threaded connection between the stem and the cap, and the two valve bodies forming a part of the cap structure provide an effective seal against the escape of air through the passages 5 and 10.

Having thus described my invention, what I claim is:

1. In a cap for a tire valve stem, a housing threaded for detachable connection with a valve stem at one end, said housing being provided with a valve seat at the other end and a second valve seat intermediate its ends, a valve on each valve seat, springs within the housing for seating the valves, one of said valves having a stem projecting to a point adjacent the other valve, the valve on the end seat having a portion extending beyond the end of the housing whereby said valve may be depressed against the tension of its spring to clear said valve seat and whereby upon further movement of depression the other valve is unseated by said movement, transmitted from one valve to the other through the projecting stem.

2. In a cap for a tire valve stem, a housing open at opposite ends and formed at one end with means for securing to a valve stem, a shoulder in the housing; a valve and seat assembly unit mounted in the housing and comprising a seat member having an annular portion and a seat portion extending therefrom, a valve on the seat portion, a rod secured to the valve and extending through the seat member, a spring secured to the rod and engaging the said member to retain the valve on its seat; said unit being inserted in said housing with the annular portion of the seat member clamped to the shoulder of the housing upon assembly thereof with a valve stem; and means mounted for axial movement in said housing independent of said valve and having a portion extending through the free end of the housing, said means being depressible to engage said stem and thereby unseat said valve.

ERNEST J. DOWDEN.